US007730183B2

(12) United States Patent
Brown et al.

(10) Patent No.: US 7,730,183 B2
(45) Date of Patent: Jun. 1, 2010

(54) SYSTEM AND METHOD FOR GENERATING VIRTUAL NETWORKS

(75) Inventors: S. Morris Brown, Seattle, WA (US); Adam E. Zilinskas, Kirkland, WA (US); Danny Huang, Seattle, WA (US); Erwin C. Abinion, Kirkland, WA (US); Laura Delhy Machado de Wright, Redmond, WA (US); Randall J. Feigner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1147 days.

(21) Appl. No.: 11/035,260

(22) Filed: Jan. 13, 2005

(65) Prior Publication Data
US 2006/0155708 A1 Jul. 13, 2006

(51) Int. Cl.
G06F 15/173 (2006.01)
G06F 15/16 (2006.01)
G06F 9/00 (2006.01)

(52) U.S. Cl. ............ 709/226; 709/227; 709/229; 726/15

(58) Field of Classification Search ............ 709/227, 709/229, 226; 726/15
See application file for complete search history.

(56) References Cited

U.S. PATENT DOCUMENTS

| 5,323,452 | A * | 6/1994 | Dickman et al. ...... 379/201.04 |
| 5,504,921 | A * | 4/1996 | Dev et al. ............... 709/223 |
| 6,085,238 | A * | 7/2000 | Yuasa et al. ............ 709/223 |
| 6,345,297 | B1 * | 2/2002 | Grimm et al. ........... 709/227 |
| 6,389,432 | B1 * | 5/2002 | Pothapragada et al. ... 707/205 |
| 6,421,711 | B1 * | 7/2002 | Blumenau et al. ....... 709/213 |
| 6,496,847 | B1 * | 12/2002 | Bugnion et al. ........... 718/1 |
| 6,681,234 | B2 * | 1/2004 | Sokolov et al. .......... 707/206 |
| 7,124,246 | B2 * | 10/2006 | Nagasuka et al. ........ 711/114 |
| 7,150,007 | B2 * | 12/2006 | Ionescu ................. 717/125 |
| 7,249,174 | B2 * | 7/2007 | Srinivasa et al. ......... 709/223 |
| 7,281,188 | B1 * | 10/2007 | Bonwick et al. ......... 714/752 |
| 7,299,256 | B2 * | 11/2007 | Pradhan et al. .......... 709/203 |
| 7,337,287 | B2 * | 2/2008 | Morimoto ............... 711/162 |
| 2002/0049803 | A1 * | 4/2002 | Bandhole et al. ......... 709/104 |

(Continued)

OTHER PUBLICATIONS

Microsoft Virtual Server 2005 Technical Overview, Microsoft Virtual Server 2005 White Paper, Sep. 29, 2004, 26 pages.

*Primary Examiner*—Benjamin R Bruckart
*Assistant Examiner*—Guang Li
(74) *Attorney, Agent, or Firm*—Workman Nydegger

(57) ABSTRACT

A system and method for generating and/or managing virtual network(s) is provided. The system provides an interface for end-user(s) to create a virtual network (e.g., on-demand). The virtual network comprises a plurality of servers that allow the user to, for example, develop and/or test software, migrate applications, apply tasks and/or troubleshoot scenarios in a simulated, distributed environment.

A user can communicate with the system via an interface (e.g., web-based) to create and/or manage the virtual network. Additionally, the system can employ a common infrastructure to facilitate creation and/or management of a variety of virtual deployment configurations. The common infrastructure can be designed, for example, by administrator(s) having knowledge of hardware and/or software available for employment within the virtual network.

The system can further provide a load-balancing mechanism to determine and/or distribute workload to computer(s) with available resource(s). Additionally, the system can expire virtual session(s) that are no longer in use thereby releasing resources for other user(s) and/or session(s).

17 Claims, 14 Drawing Sheets

U.S. PATENT DOCUMENTS

| | | | |
|---|---|---|---|
| 2002/0056008 A1* | 5/2002 | Keane et al. | 709/245 |
| 2002/0073404 A1* | 6/2002 | Sokolov et al. | 717/131 |
| 2002/0091833 A1* | 7/2002 | Grimm et al. | 709/227 |
| 2002/0103889 A1* | 8/2002 | Markson et al. | 709/223 |
| 2003/0084156 A1* | 5/2003 | Graupner et al. | 709/226 |
| 2003/0130833 A1* | 7/2003 | Brownell et al. | 703/23 |
| 2003/0154279 A1* | 8/2003 | Aziz | 709/225 |
| 2004/0123063 A1* | 6/2004 | Dalal et al. | 711/170 |
| 2004/0205179 A1* | 10/2004 | Hunt et al. | 709/223 |
| 2005/0108362 A1* | 5/2005 | Weinert et al. | 709/217 |
| 2006/0069761 A1* | 3/2006 | Singh et al. | 709/222 |
| 2007/0130366 A1* | 6/2007 | O'Connell et al. | 709/238 |
| 2007/0234302 A1* | 10/2007 | Suzuki et al. | 717/126 |
| 2008/0059556 A1* | 3/2008 | Greenspan et al. | 709/201 |

* cited by examiner

SYSTEM AND METHOD FOR GENERATING VIRTUAL NETWORKS

TECHNICAL FIELD

The subject invention relates generally to computer systems, and, more particularly to a system and method for generating and/or managing virtual networks.

BACKGROUND OF THE INVENTION

Software application development and testing can be a time-intensive process. A simulated environment for developing, testing, troubleshooting etc. software application(s) can be helpful in the development process. However, the configuration of appropriate hardware and/or software on dedicated physical computer(s) can be prohibitively expensive and/or time consuming.

Many software development companies provide dedicated test computers and laboratories for employees to build simulated environments internally. These environments are typically similar to the physical run-time environments, but are not run in a production state (e.g., inaccessible by end-users of the software).

User(s) desiring, for example, to develop and/or test software application(s) generally must install and configure the appropriate hardware and software requirements on dedicated physical computers. This task typically requires significant time and resources, depending on the requirements. To simplify the complexities in configuring simulated test environments, many organizations delegate such configuration tasks to Information Technology (IT) Administrators or other personnel who are skilled in the art of configuring network hardware.

These Administrators perform the installation and configuration of the test environment so that employees and users are removed from this process. The employees and users meet with Administrators in the initial setup stage to define the appropriate configuration requirements. The Administrators then build the configuration so that the users have a simulated environment to test and troubleshoot against.

As the demand and value of creating simulated environments increases, software companies have developed sophisticated tools and products that allow virtual networks (e.g., multiple virtual machines) to run on a single physical server. These products significantly reduce the resources needed to support simulated environments, but require additional time and in-depth knowledge of how to use these products.

SUMMARY OF THE INVENTION

The following presents a simplified summary of the subject invention in order to provide a basic understanding of some aspects of the subject invention. This summary is not an extensive overview of the subject invention. It is not intended to identify key/critical elements of the subject invention or to delineate the scope of the subject invention. Its sole purpose is to present some concepts of the subject invention in a simplified form as a prelude to the more detailed description that is presented later.

The subject invention relates generally to creating and managing virtual software environments for simulating distributed server deployments. Specifically, the present invention pertains to automatically creating virtual machines and networks based on real-time user input and resource availability.

In accordance with an aspect of the subject invention, a virtual network management system is provided. The system facilitates creation and/or management of virtual network(s). For example, a user can communicate with the system via an interface (e.g., web-based) to create and/or manage a virtual network. The virtual network comprises a plurality of servers that allow the user to, for example, develop and/or test software, migrate applications, apply tasks and/or troubleshoot scenarios in a simulated, distributed environment. Thus, the system facilitates creation of a virtual environment that simulates physically-distributed server deployments.

The system simplifies the process of configuring virtual network(s). Unlike conventional systems which generally require dedicated hardware for each configuration, the system provided by the present invention is flexible since it can employ a common physical infrastructure to support a variety of virtual networks, for example, each potentially comprising multiple computers. Additionally, while conventional systems typically required Administrator-level collaboration for each environment to be simulated, the system facilitates virtual network configuration by non-technical user(s) without administrator involvement.

An aspect of the subject invention provides for the system to facilitate load-balancing to distribute workload to computer(s) with available resource(s). Further, the system can expire virtual session(s) that are no longer in use thereby releasing resources for other user(s) and/or session(s).

Yet another aspect of the subject invention provides for the system to include a user interface component which receives information associated with a user's requirement(s) for the virtual network. The user interface component can facilitate identification of hardware and/or software parameter(s), for example: operating system(s), processor(s), memory, virtual storage, graphics, floppy drives, ports for peripheral device(s) (e.g., serial ports, parallel ports, firewire ports, USB ports etc.) and/or device(s). The user interface component can further receive temporal information, for example, a length of time for the virtual network to be in effect. The user interface component provides information associated with the user's requirement(s) for the virtual network to an identification component.

The user interface component can employ a common infrastructure to facilitate creation and/or management of a variety of virtual deployment configurations. The common infrastructure can be designed, for example, by administrator(s) having knowledge of hardware and/or software available for employment within the virtual network.

The identification component identifies server(s), if any, that fulfill the user's requirement(s) and are available for deployment. Identification can be based, for example, upon communication with at least a portion of the plurality of servers. Additionally and/or alternatively, the identification component can review server configuration information to identify server(s), as discussed below.

Thereafter, the identification component provides configuration information associated with the identifier servers to a creation component. The configuration information can be provided, for example, in a message and/or stored in a computer-readable storage medium The creation component can create a virtual server session with the servers identified by the identification component. For example, the creation component can retrieve a message (e.g., from a message queue and/or message storage) and parse the message to retrieve information (e.g., a target driver letter, job identifier and/or server configuration).

The creation component can create a subdirectory to host the virtual server session. Additionally, the creation component can create a differencing drive file that defines the deployment configuration. A differencing drive file enables a user to employ multiple operating system configurations that are based on a single operating system installation, for example, to allow tests with several minor variations of the same operating system without consuming a large amount of disk space. Thereafter, the creation component can create a virtual machine and attach the virtual differencing drive file to the virtual machine.

The creation component can then create a virtual network and attach the virtual machine to the virtual network. The creation component can attach the virtual machine to a network adapter of the virtual network, and, start the established virtual network.

To the accomplishment of the foregoing and related ends, certain illustrative aspects of the subject invention are described herein in connection with the following description and the annexed drawings. These aspects are indicative, however, of but a few of the various ways in which the principles of the subject invention may be employed and the subject invention is intended to include all such aspects and their equivalents. Other advantages and novel features of the subject invention may become apparent from the following detailed description of the subject invention when considered in conjunction with the drawings.

DETAILED DESCRIPTION OF THE INVENTION

Figure 1:
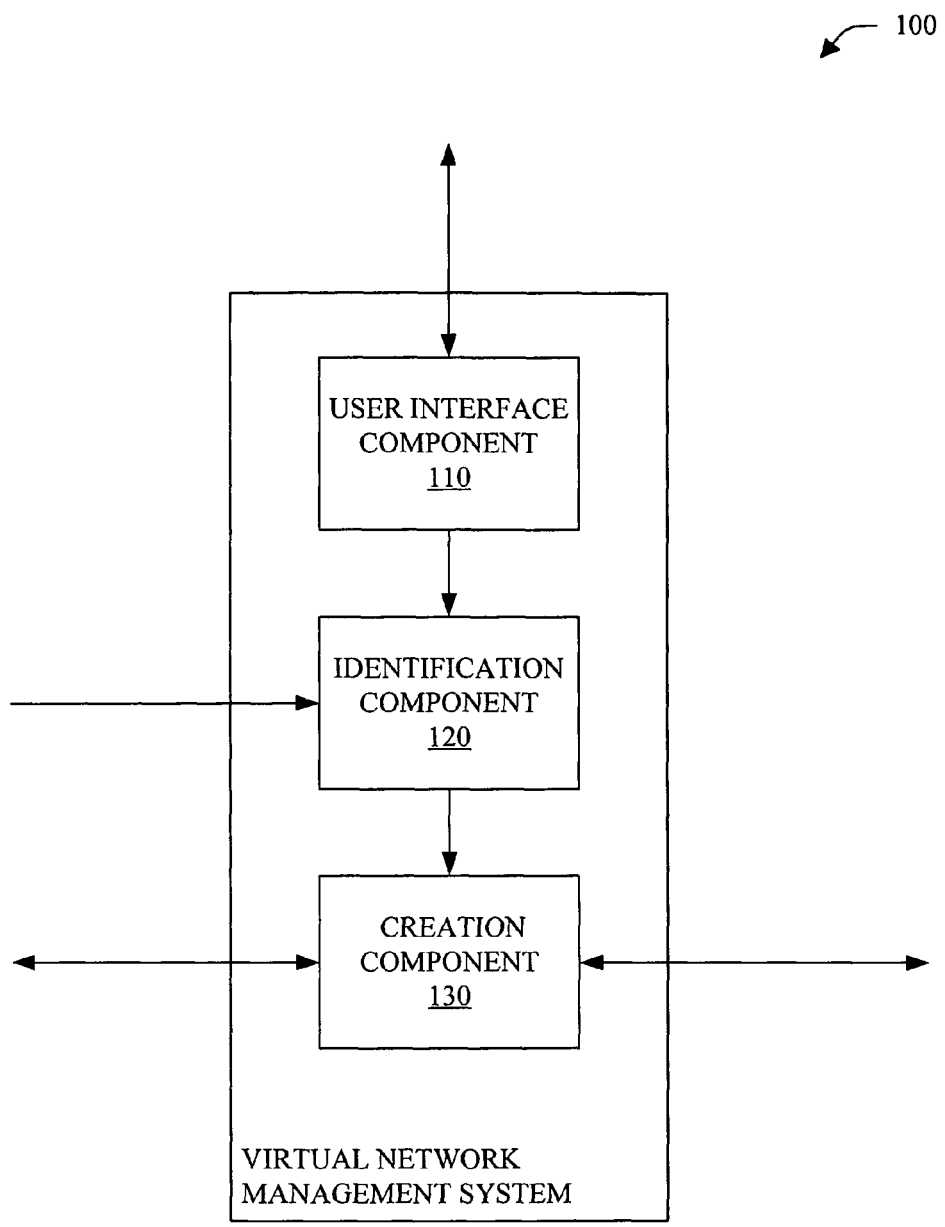
FIG. 1 is a block diagram of a virtual network management system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the subject invention.

The subject invention relates generally to creating and managing virtual software environments for simulating distributed server deployments. Specifically, the present invention pertains to automatically creating virtual servers and networks based on real-time user input and resource availability.

The system facilitates creation of a virtual network with minimal user involvement. Conventional systems reduced the resources required to support simulated software environments by allowing multiple virtual servers to run on the same physical server; however, conventional systems do not simplify the intrinsic complexities associated with configuring these distributed deployments. To the contrary, conventional system can actually increase the amount of time required to configure these simulated environments.

Referring to FIG. 1, a virtual network management system 100 in accordance with an aspect of the subject invention is illustrated. The system 100 facilitates creation and/or management of virtual network(s). For example, a user can communicate with the system 100 via a user interface (e.g., web-based) to create and/or manage a virtual network. The virtual network comprises a plurality of servers that allow the user to, for example, develop and/or test software, migrate applications, apply tasks and/or troubleshoot scenarios in a simulated, distributed environment. Thus, the system 100 facilitates creation of a virtual environment that simulates physically-distributed server deployments.

The system 100 facilitates creation of a virtual network with minimal user involvement. While conventional systems reduced the resources required to support simulated software environments by allowing multiple virtual servers to run on the same physical server, conventional systems did not simplify the intrinsic complexities associated with configuring these distributed deployments. To the contrary, conventional systems actually increased the amount of time required to configure these simulated environments.

The system 100 simplifies the process of configuring virtual network(s). Unlike conventional systems which generally required dedicated hardware for each configuration, the system 100 is flexible since it employs a common physical infrastructure. Additionally, while conventional systems typically required Administrator-level collaboration for each environment to be simulated, the system 100 facilitates virtual network configuration by non-technical user(s) without administrator involvement.

Optionally, the system 100 can provide a load-balancing mechanism to determine and/or distribute workload to computer(s) with available resource(s). Further, the system 100 can expire virtual session(s) that are no longer in use thereby releasing resources for other user(s) and/or session(s).

The system 100 includes a user interface component 110 which receives information associated with a user's requirement(s) for the virtual network. The user interface component 110 can facilitate identification of hardware and/or software parameter(s), for example: operating system(s), processor(s), memory, virtual storage, graphics, floppy drives, serial ports, parallel ports and/or device(s). The user interface component 110 can further receive temporal information, for example, a length of time for the virtual network to be in effect. The user interface component 110 provides information associated with the user's requirement(s) for the virtual network to an identification component 120.

In one example, the user interface component 110 employs a common infrastructure to facilitate creation and/or management of a variety of virtual deployment configurations. The common infrastructure can be designed, for example, by administrator(s) having knowledge of hardware and/or software available for employment within the virtual network.

With the common infrastructure designed, a user can select from a variety of deployment configurations to simulate a virtual environment (e.g., without administrator and/or developer intervention). For example, the common infrastructure can identify available operating system(s), processor(s), memory, virtual storage, graphics, floppy drives, serial ports, parallel ports and/or device(s). In this manner, information presented to the user can be limited to deployment configuration available to simulate a virtual environment which can significantly reduce configuration time and/or user frustration. Accordingly, non-technical user(s) can configure virtual network(s) without the in-depth knowledge of technical issues as required with conventional simulation environments.

In another example, the user interface component 110 employs an interface (e.g., web-based) that allows a user to configure the virtual network in real-time. In this example, the user's requirement and resource availability (as discussed below) are determined in real-time. Further, if matching resources are found, the requested virtual network can similarly be created in real-time, thus reducing latency issues experienced with conventional systems. For example, the user interface component 110 can generate a message (e.g., XML) comprising the user's requirements. The user interface component 110 can further send the generated message to the identification component 120. In one example, the message is sent via a message queue; however, any suitable messaging technique can be employed in accordance with an aspect of the subject invention.

The identification component 120 identifies server(s), if any, that fulfill the user's requirement(s) and are available for deployment. Identification can be based, for example, upon communication with at least a portion of the plurality of servers. Additionally and/or alternatively, the identification component 120 can review server configuration information to identify server(s), as discussed below.

Figure 2:
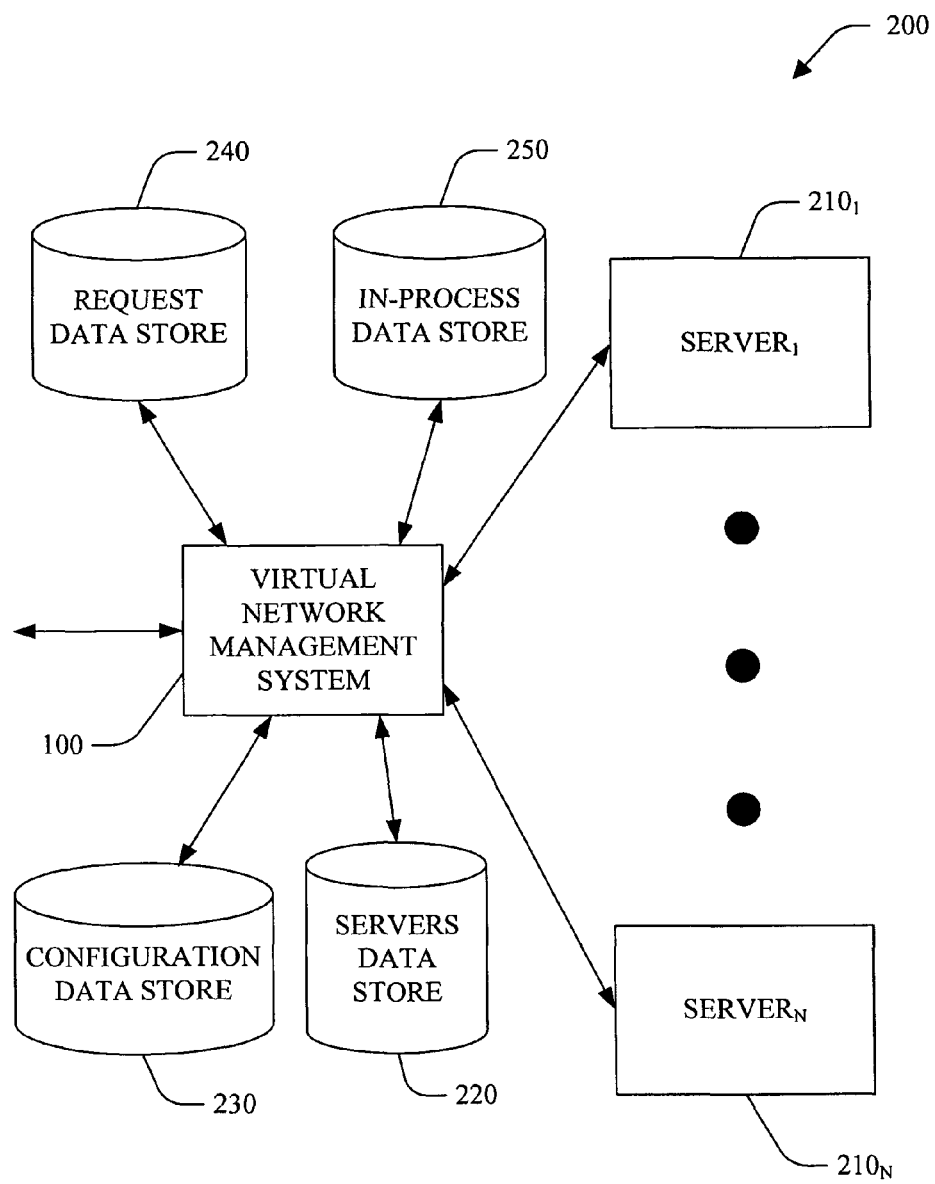
FIG. 2 is a block diagram of a virtual network system in accordance with an aspect of the subject invention.

Thereafter, the identification component 120 provides configuration information associated with the identifier servers to a creation component 130. The configuration information can be provided, for example, in a message and/or stored in a computer-readable storage medium Turning briefly to FIG. 2, a virtual network system 200 in accordance with an aspect of the subject invention is illustrated. The system 200 includes a virtual network management system 100 and a plurality of servers 210.

In this example, the virtual network management system 100 and, more particularly, the identification component 120 can query at least some of the servers 210 to determine the server 210's available resources. Based, at least in part, upon the servers 210 available resources and the user's requirement(s), the identification component 120 can identify virtual servers which fulfill the user's requirement(s) for the virtual network.

In one example, the identification component 120 further facilitates load-balancing by taking into account current and scheduled workloads of the virtual servers 220. In this example, when identifying servers that fulfill the user's requirement(s), the identification component 120 first attempts to distribute the workload to virtual servers with the most available resources matching the user's requirement(s).

In another example, the system 200 includes a server data store 220 that stores configuration information for each physical server in the deployment infrastructure. For example, the configuration information can be employed by the virtual network management system 100 in identifying resource(s) for a virtual network request. The system 200 can further include a configuration data store (e.g., configurations database table) that stores configuration information for a desired deployment configuration.

In yet a third example, the identification component 120 retrieves an XML message from a message queue and parses the message to retrieve information. The identification component 120 then calculates the quantity of resources required to support the requested virtual session. The identification component 120 enumerates the physical servers 210 available in a cluster. The identification component 120 reviews information stored in the servers data store 220, for example for previous session instantiation(s) (e.g., accounts for allocated resource in other sessions).

The identification component 120 can then validate the information stored in the server configuration data store to ensure that a target server meets the total resource requirements. The identification component 120 can, for example, invoke an interface (e.g., Windows Management and Instrumentation (WMI)) that validates the target server for real-time resource availability. Similarly, the identification component 120 can invoke an interface that identifies a specific drive to host the virtual session. The identification component 120 can append the drive letter to the received XML message and send the update message (e.g., to a message queue) for processing by the creation component 130. The identification component can further update the servers data store 220 to reflect the resource(s) committed to the request.

Optionally, the system 100 can store information associated with the request in a request data store 240 and/or information associated with the status of requests in an in-process data store 250.

Referring back to FIG. 1, the creation component 130 can create a virtual server session with the servers identified by the identification component 120. In one example, the creation component 130 can retrieve an XML message (e.g., from a message queue). Thereafter, the creation component 130 can parse the XML message to retrieve information, for example, a target driver letter, job identifier and/or server configuration.

The creation component 130 can create a subdirectory to host the virtual server session. Additionally, the creation component 130 can create a differencing drive file that defines the deployment configuration. Thereafter, the creation component 130 can create a virtual machine. The creation component 130 can attach the virtual differencing drive file to the virtual machine.

Then the creation component 130 can create a virtual network and attach the virtual machine to a network adapter of the virtual network. The creation component 130 can further start the established virtual network and send an XML message for completion (e.g., to a message queue).

Thus, the creation component 130 can create a virtual network employing the servers identified. Additionally, the creation component 130 can provide information, for example, to the user interface component 110 with respect to the virtual network created for the user (e.g., virtual network available for user).

Figure 3:
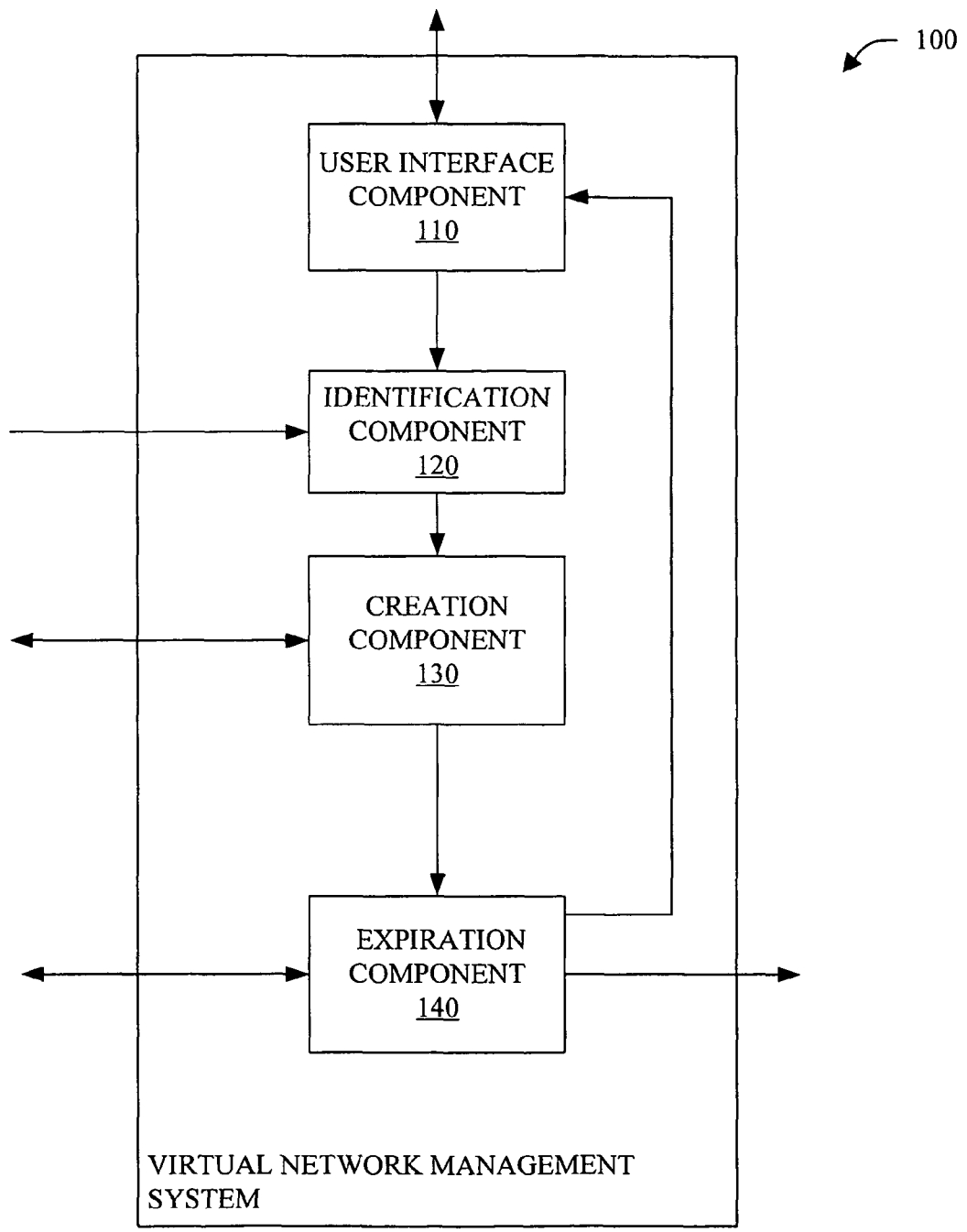
FIG. 3 is a block diagram of a virtual network management system in accordance with an aspect of the subject invention.

Referring briefly to FIG. 3, the system 100 can, optionally, include an expiration component 140. The expiration component 140 can expire virtual session(s) that are no longer in use by releasing resource(s), for example, for user by other user(s).

In one example, the expiration component 140 retrieves an XML message (e.g., from a message queue) and parses the message for information. Thereafter, the expiration component 140 invokes a database stored procedure to mark a particular session as completed. The expiration component 140 can then send notification to a user that the request has been completed.

In another example, the expiration component 140 further facilitates deletion of expired virtual sessions. The expiration component 140 can retrieve a virtual machine name from a received XML message. For example, by invoking an application program interface (API), the expiration component 140 can stop the virtual machine. Similarly, the expiration component 140 can invoke an API to stop a virtual network. The expiration component 140 can delete the subdirectory for the expired session and send an XML message for completion (e.g., to a message queue).

Optionally, user(s) can be notified of expiration through the user interface component 110.

It is to be appreciated that the virtual network management system 100, the user interface component 110, the identification component 120, the creation component 130 and/or the expiration component 140 can be computer components as that term is defined herein.

Turning briefly to FIGS. 4-13, methodologies that may be implemented in accordance with the subject invention are illustrated. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

The subject invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 4:
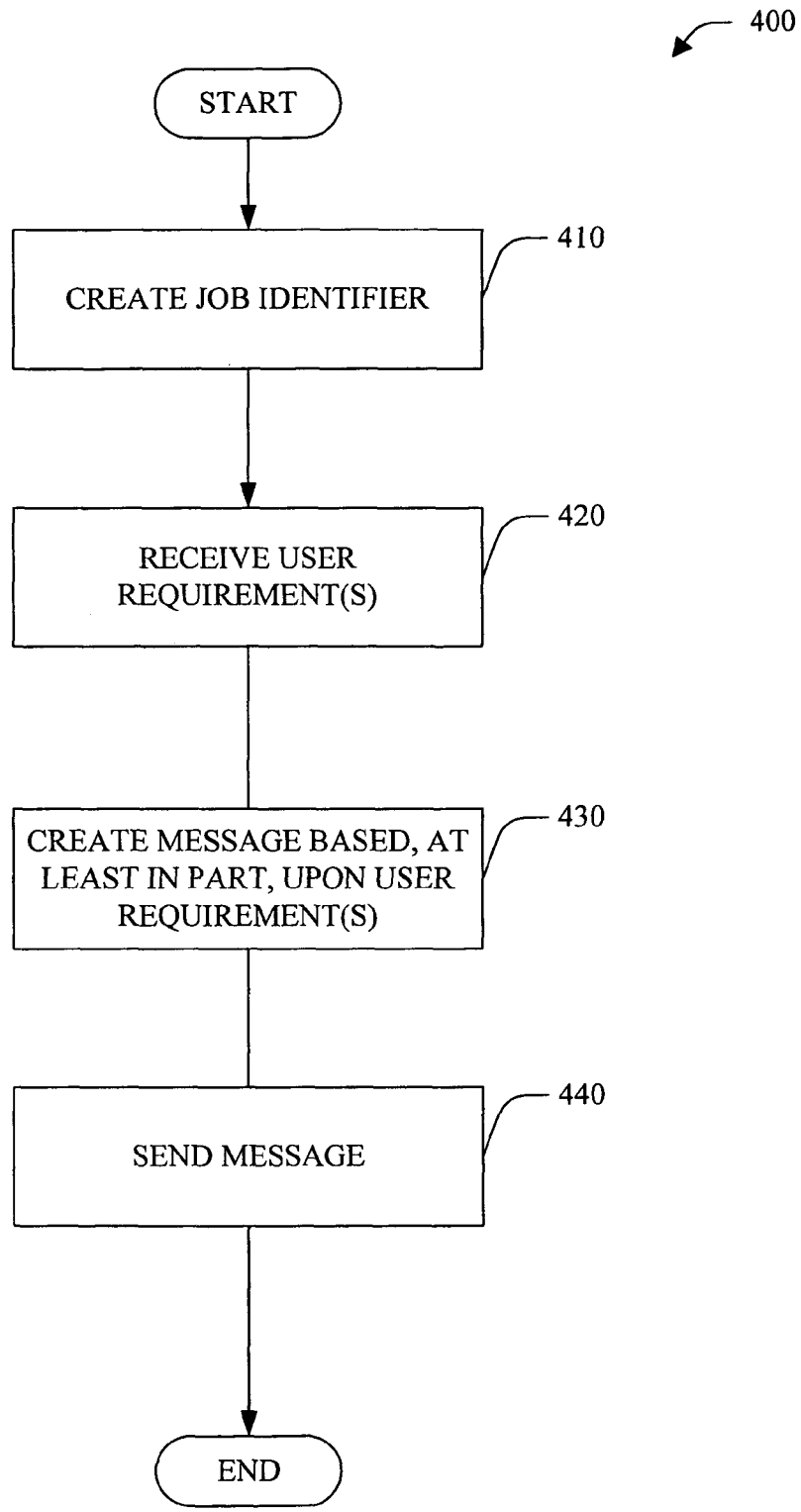
FIG. 4 is a flow chart of a method of defining a configuration to simulate a virtual environment in accordance with an aspect of the subject invention.

Referring to FIG. 4, a method of defining a configuration to simulate a virtual environment 400 in accordance with an aspect of the subject invention is illustrated. At 410, a job identifier (e.g., unique identifier) is created (e.g., generated). At 420, a user requirement(s) for the virtual network are received (e.g., via a web-based interface).

At 430, a message is created based, at least in part, upon the user's requirement(s). For example, the message can comprise an XML message with empty elements to be filled in during the virtual server creation process. At 440, the message is sent (e.g., placed in a queue), and, no further processing occurs.

Figure 5:
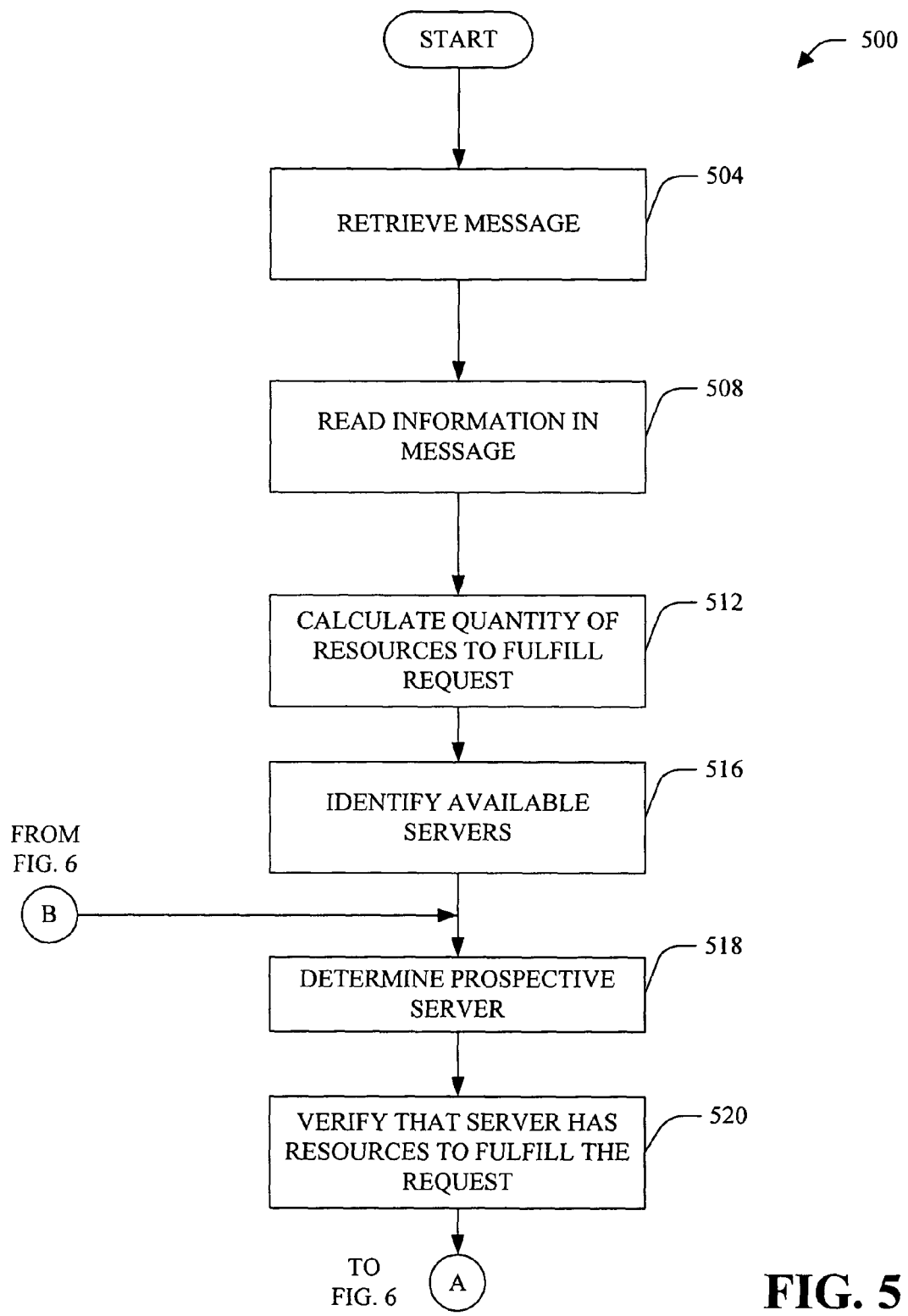
FIG. 5 is a flow chart of a method for allocating system resources in accordance with an aspect of the subject invention.
Figure 6:
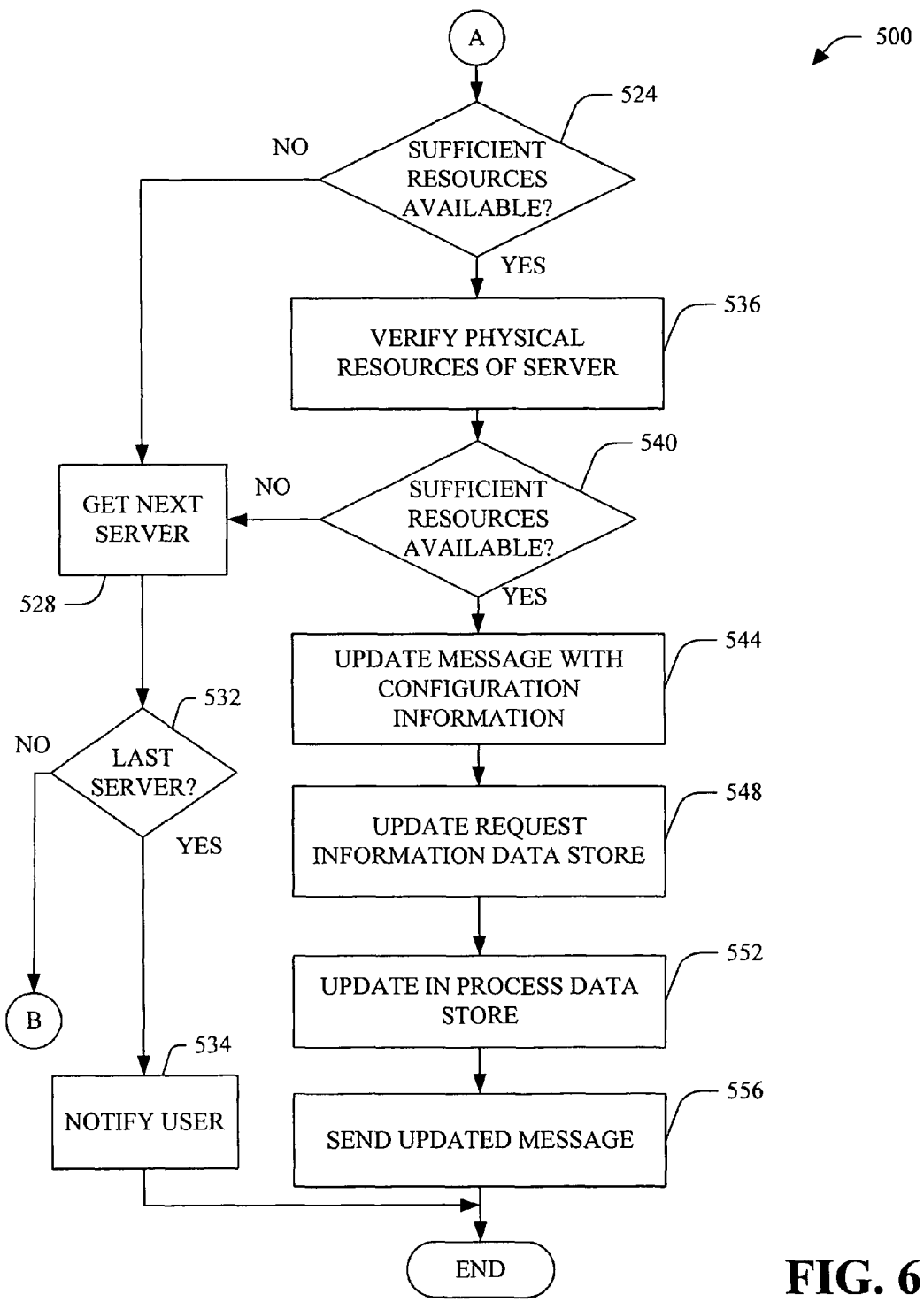
FIG. 6 is a flow chart further illustrating the method of FIG. 5.

Turning to FIGS. 5 and 6, a method for allocating system resources 500 in accordance with an aspect of the subject invention is illustrated. At 504, a message is retrieved (e.g., XML message). At 508, information in the message is read. At 512, a total quantity of resources to fulfill a request is calculated.

At 516, available servers are identified (e.g., enumerate physical servers available in a cluster, for example, using information stored in servers data store and/or servers database table). At 518, a prospective server is identified (e.g., next machine to be tried). For example, a registry (e.g., data store) for previous session instantiations can be checked to account for allocated resources in other session(s). At 520, the prospective server is verified to ensure that it has the resource(s) to fulfill the request. For example, a server data store and/or server database table can be checked to verify that the particular server has the total resource to meet the request. Further, restrictions can be checked on the server (e.g., in a restrictions table).

Next, at 524, a determination is made as to whether the prospective server has sufficient resources available. For example, a WMI call can be made to the specific server list to check on current resources. If the determination at 524 is NO, at 528, the next available server is attempted to be identified. At 532, a determination is made as to whether the last server has already been identified. If the determination at 532 is NO, processing continues at 520. If the determination at 532 is YES, at 534, a user is notified, and, no further processing occurs.

If the determination at 524 is YES, at 536, physical resources of the server are verified. For example, a WMI call can be made to verify available RAM and which physical drive on the server can accommodate the request on the server list. At 540, a determination is made as to whether there are sufficient resources. If the determination at 540 is NO, processing continues at 528.

If the determination at 540 is YES, at 544, the received message is updated with the configuration information for the server. At 548, the request data store (e.g., table) is updated to reflect the configuration information for the server. At 552, the in-process data store (e.g., table) is updated to reflect the configuration information for the server. At 556, the updated message is sent.

Figure 7:
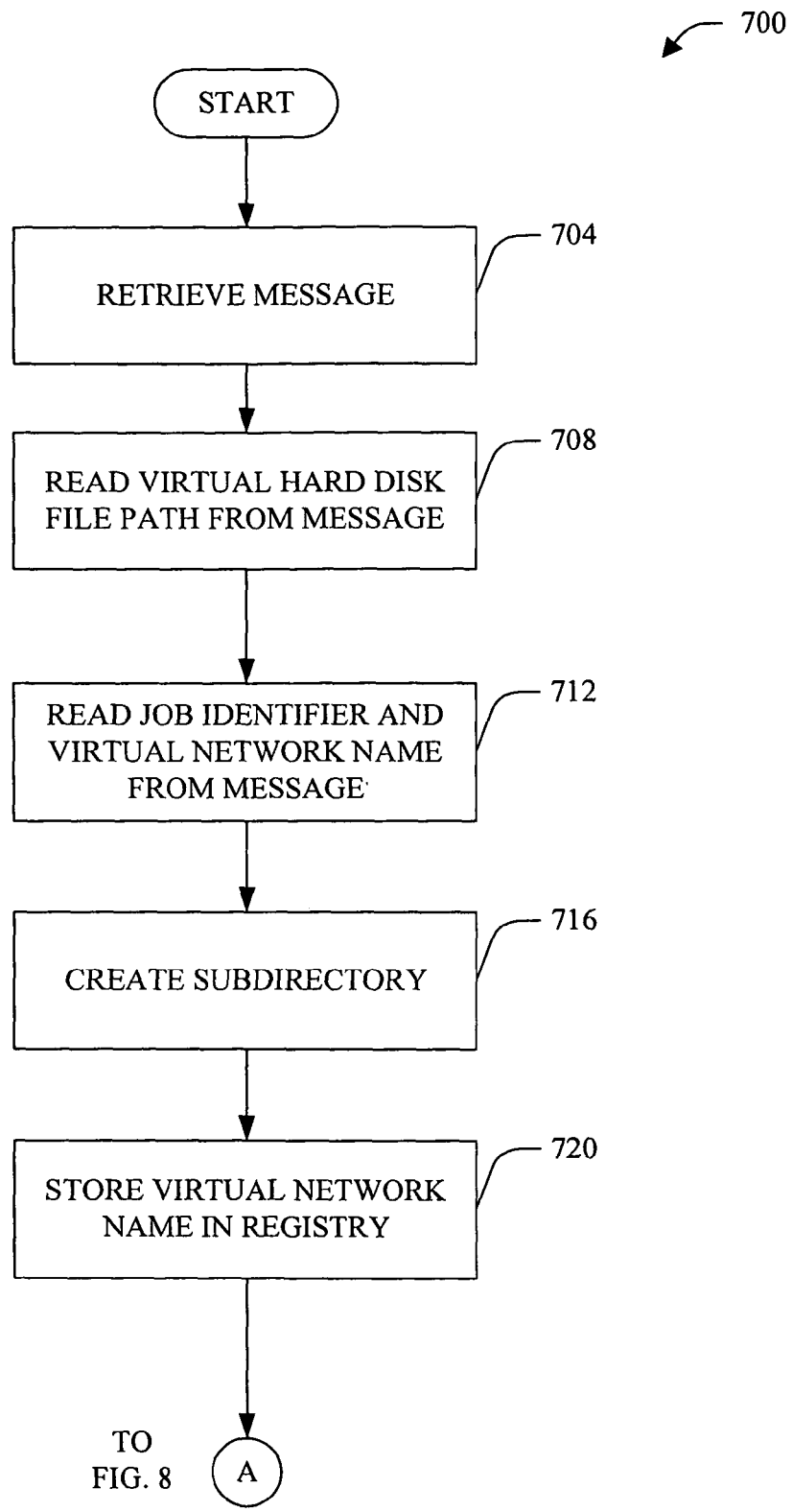
FIG. 7 is a flow chart of a method for creating a virtual server session in accordance with an aspect of the subject invention.
Figure 8:
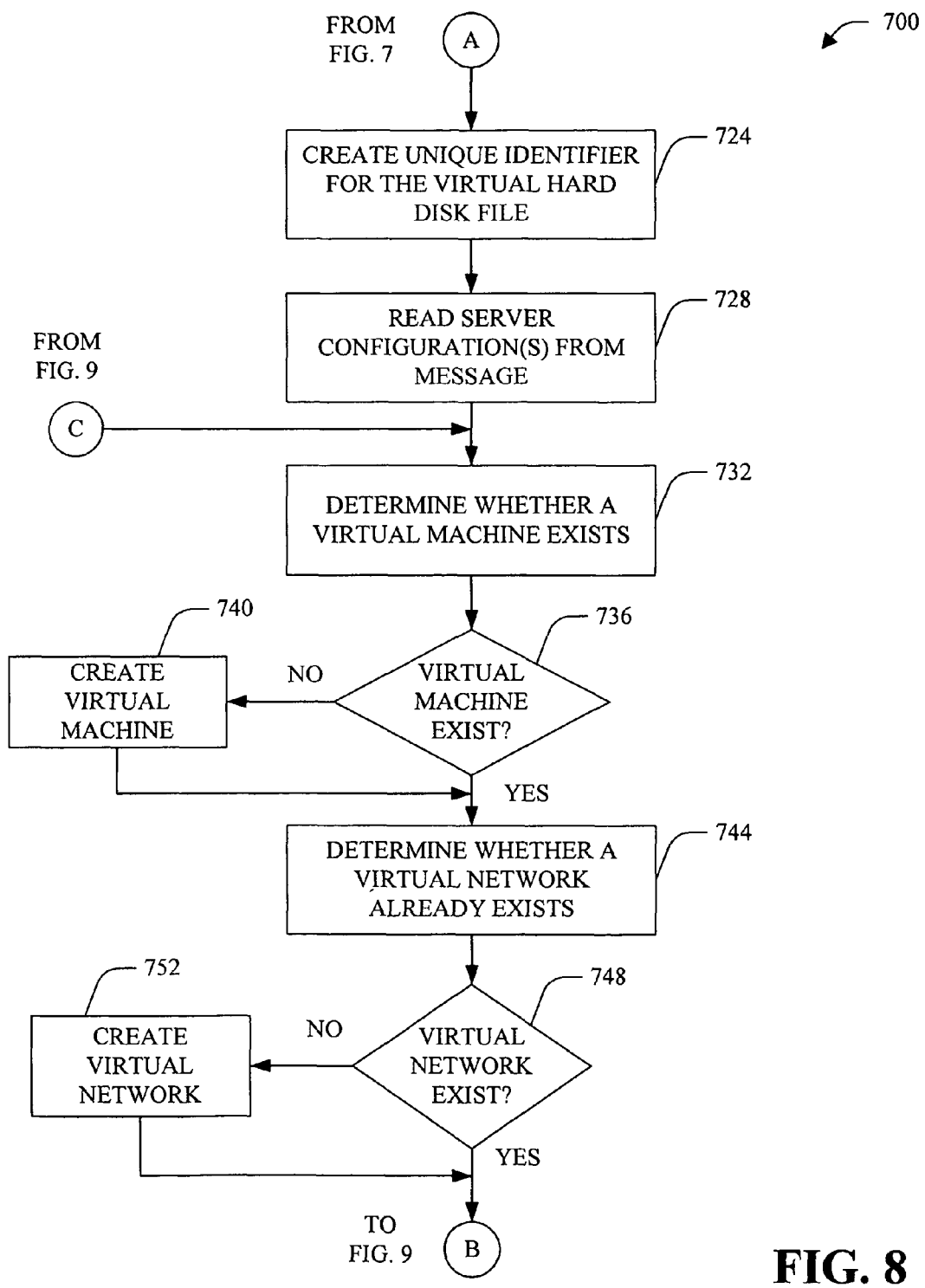
FIG. 8 is a flow chart further illustrating the method of FIG. 7.
Figure 9:
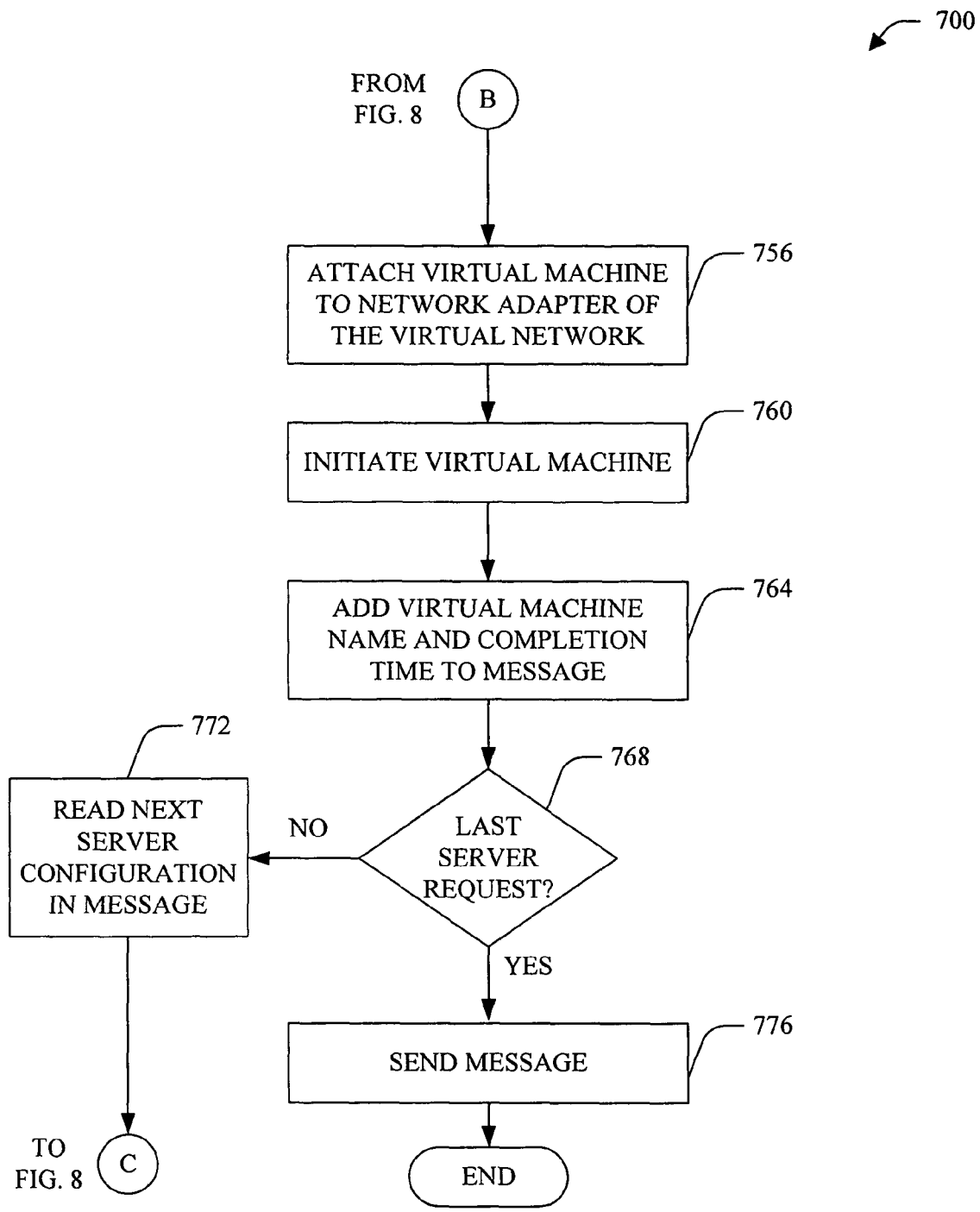
FIG. 9 is a flow chart further illustrating the method of FIGS. 7 and 8.

Next, referring to FIGS. 7-9, a method for creating a virtual server session 700 in accordance with an aspect of the subject invention is illustrated. At 704, a message is received, for example, from a message queue. At 708, a virtual hard disk file path (.vhd) is read from the message. At 712, a job identifier and virtual network name is read from the message.

At 716, a subdirectory is created, for example, with the name of the job identifier. At 720, the virtual network name (e.g., job identifier) is stored in the registry. At 724, a unique identifier is created for the virtual hard disk file (e.g., append numbers to the file and machine names until unique name is identified).

At 728, server configuration(s) are read from the message. At 732, it is determined whether a virtual machine (e.g., requested in the message) exists. At 736, a determination is made as to whether the virtual machine exists. If the determination at 736 is NO, at 740, a virtual machine is created. For example, a differencing drive file can be created, RAM limits set for the virtual server, an API called to create the virtual machine, and/or, the differencing driver attached to the virtual machine. Processing continues at 744.

If the determination at 736 is YES, at 744, it is determined whether a virtual network already exists (e.g., matching the requested configuration). At 748, a determination is made as to whether the virtual network exists. If the determination at 748 is NO, at 752, the virtual network is created, and, processing continues at 756.

If the determination at 748 is YES, at 756, the virtual machine is attached to a network adapter of the virtual network. At 760, the virtual machine is initiated. At 764, the virtual machine name and completion time is added to the message.

At 768, a determination is made as to whether the last server request has been processed. If the determination at 772 is NO, at 772, the next server configuration is read from the message and processing continues at 732. If the determination at 768 is YES, at 776, the message is sent, and, no further processing occurs.

Figure 10:
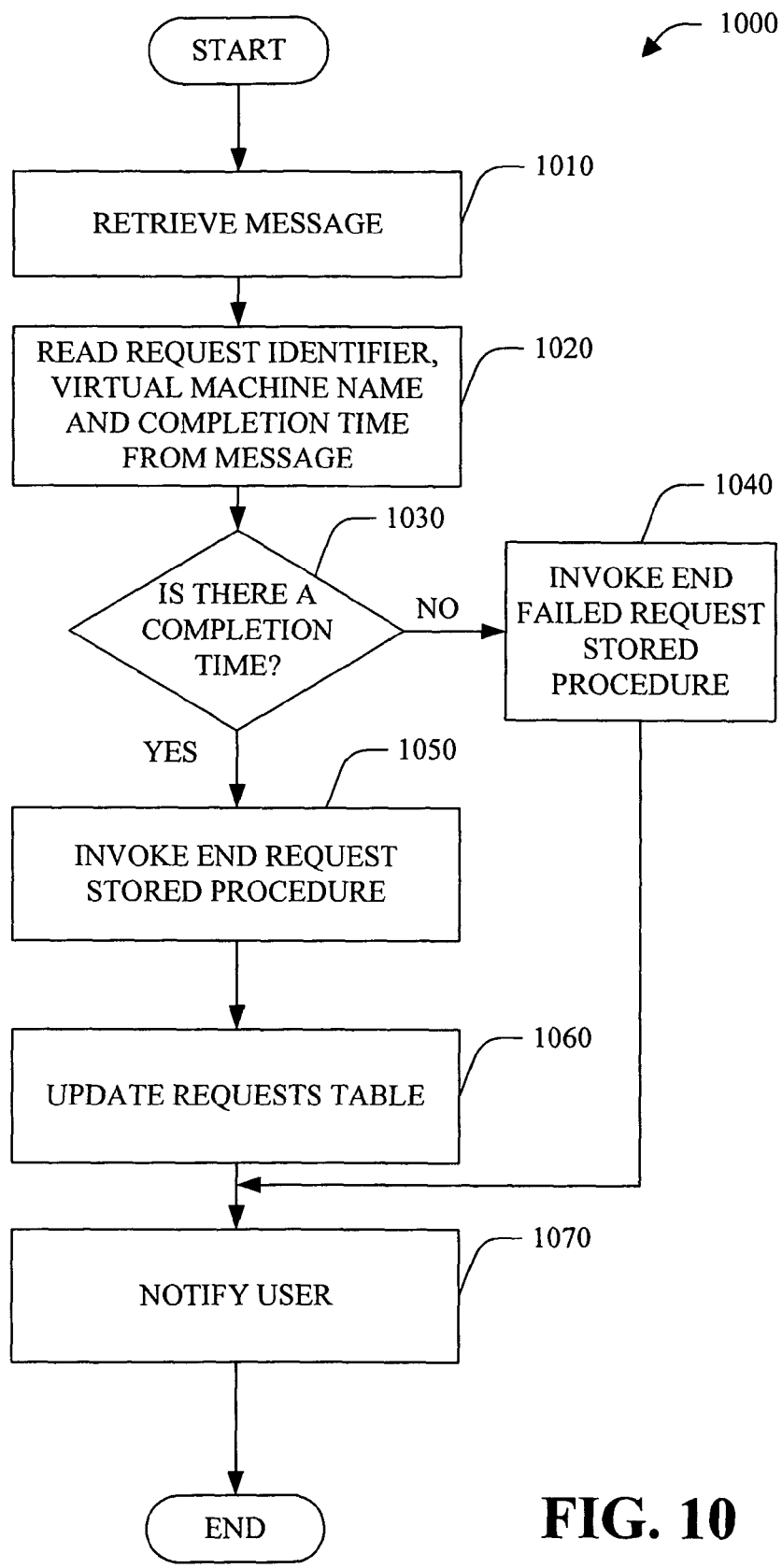
FIG. 10 is a flow chart of a method for completion notification in accordance with an aspect of the subject invention.

Turning next to FIG. 10, a method for completion notification 1000 in accordance with an aspect of the subject invention is illustrated. At 1010, a message is retrieved. At 1020, a request identifier, virtual machine name and completion time are read from the message. At 1030, a determination is made as to whether a completion time exists. If the determination at 1030 is NO, at 1040, an end failed request stored procedure is invoked, and, processing continues at 1070.

If the determination at 1030 is yes, at 1050, an end request stored procedure is invoked. At 1060, a requests table is updated. At 1070, a user is notified, for example, regarding the status of the request (e.g., e-mail sent to requester), and, no further processing occurs.

Figure 11:
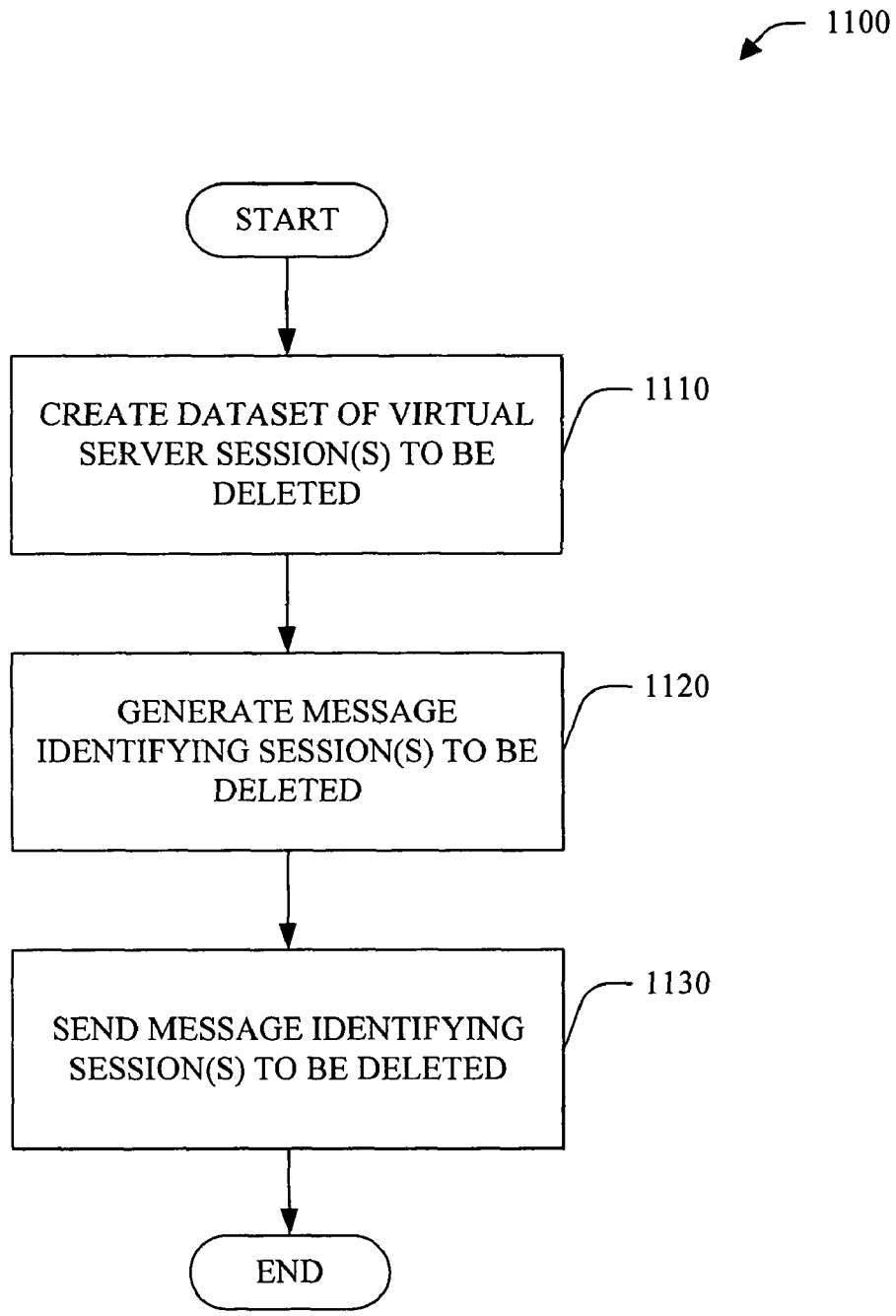
FIG. 11 is a flow chart of a method for identifying an expired virtual session in accordance with an aspect of the subject invention.

Referring next to FIG. 11, a method for identifying an expired virtual session 1100 in accordance with an aspect of the subject invention is illustrated. At 1110, a dataset of virtual server session(s) to be deleted is created. At 1120, a message identifying session(s) to be deleted is generated. For example, the dataset record can be read to build a hash table of session(s) to be deleted. Thereafter, an XML document from the hash table can be generated by adding pairs of virtual machine names and job identifiers for each physical server. At 1130, the message is sent, and, no further processing occurs.

Figure 12:
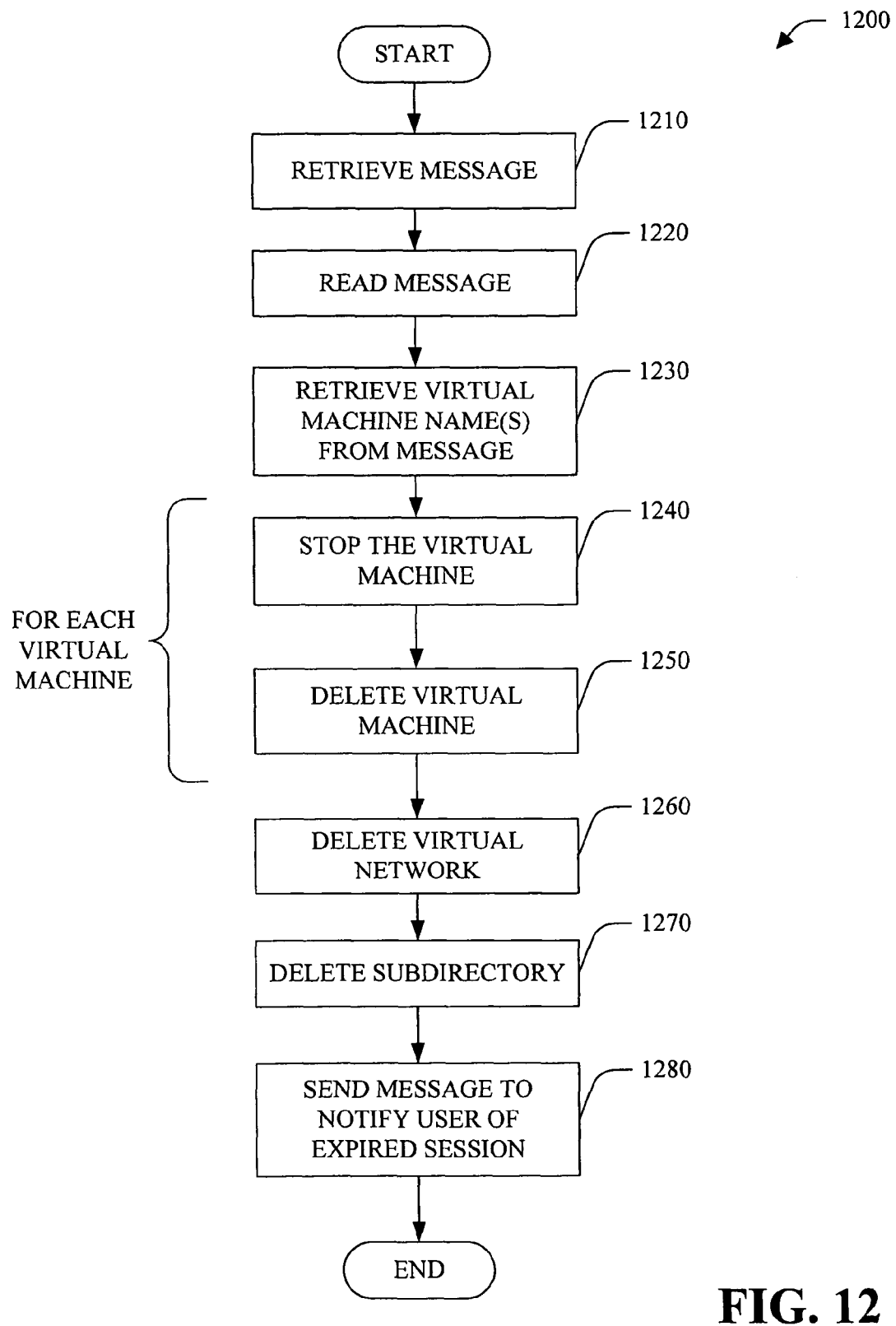
FIG. 12 is a flow chart of a method facilitating expired session deletion in accordance with an aspect of the subject invention.

Next, turning to FIG. 12, a method facilitating expired session deletion 1200 in accordance with an aspect of the subject invention is illustrated. At 1210, a message is retrieved. At 1220, the message is read. At 1230, virtual machine name(s) are retrieved from the message.

For each virtual machine, at 1240, the virtual machine is stopped, and, at 1250, the virtual machine is deleted.

At 1260, the virtual network is deleted. At 1270, the subdirectory associated with the virtual network is deleted. At 1280, a message is sent notifying of the expired session, and, no further processing occurs.

Figure 13:
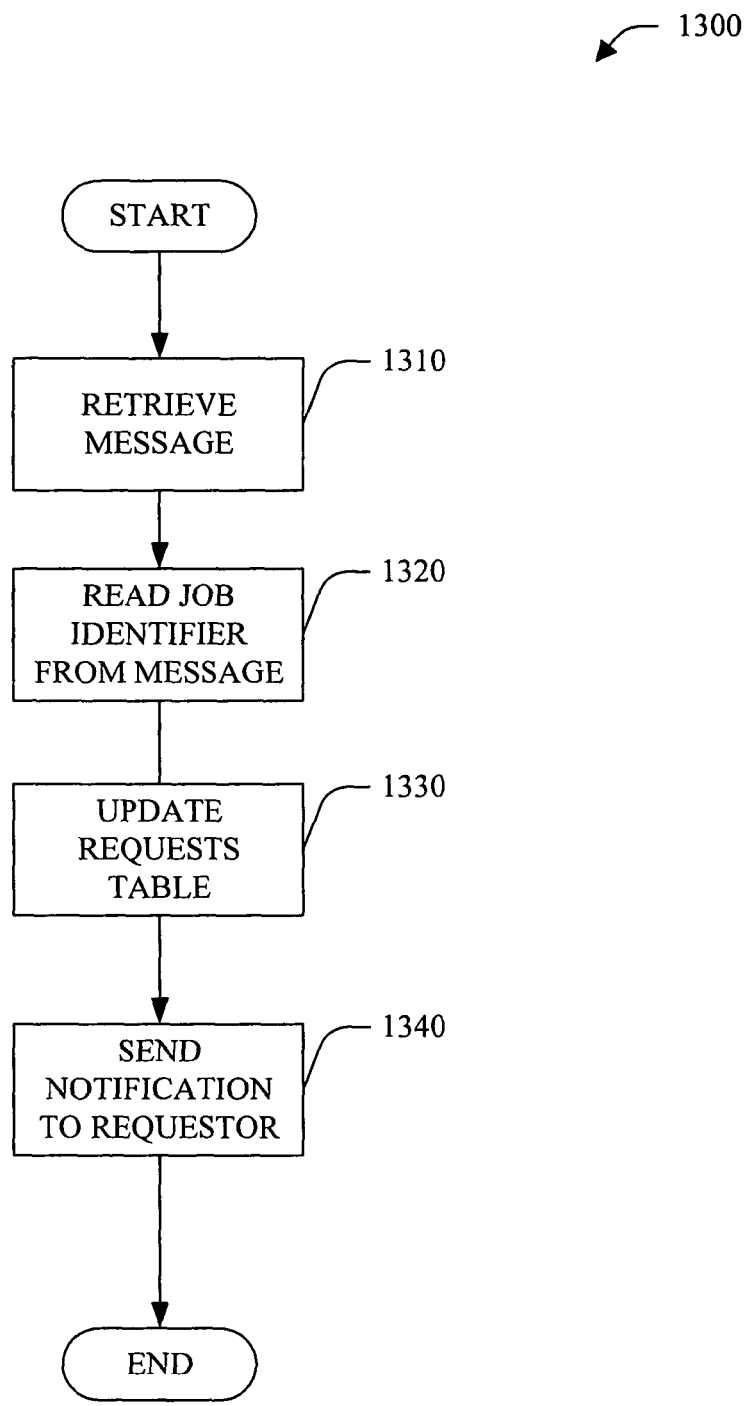
FIG. 13 is a flow chart of a method facilitating expired session notification in accordance with an aspect of the subject invention.

Referring to FIG. 13, a method facilitating expired session notification 1300 in accordance with an aspect of the subject invention is illustrated. At 1310, a message is retrieved. At 1320, a job identifier is read from the message. At 1330, a requests table is updated based, at least in part, upon the job identifier. At 1340, a notification (e.g., e-mail) is sent to the requestor.

Figure 14:
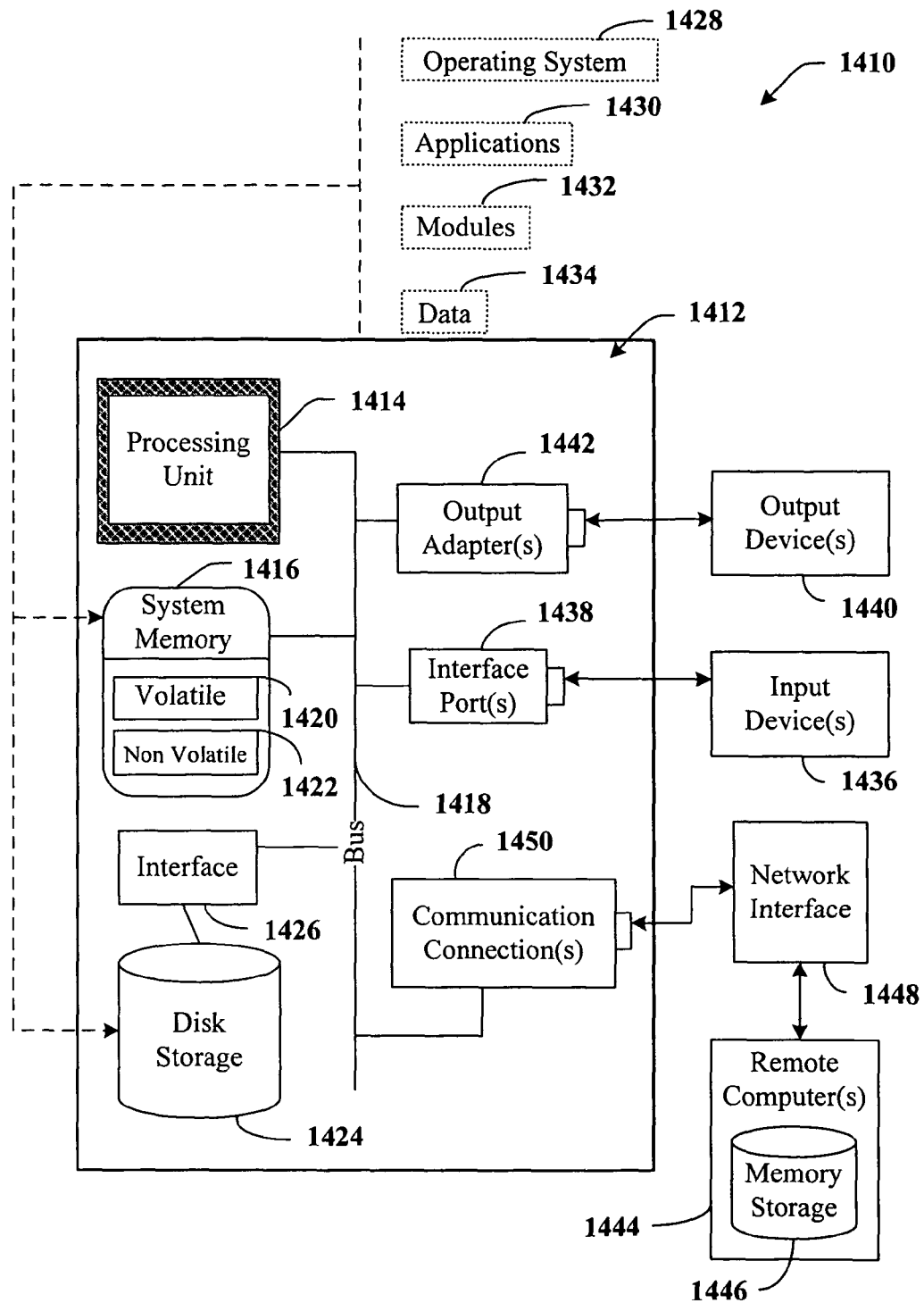
FIG. 14 illustrates an example operating environment in which the invention may function.

In order to provide additional context for various aspects of the subject invention, FIG. 14 and the following discussion is intended to provide a brief, general description of a suitable operating environment 1410 in which various aspects of the subject invention may be implemented. While the subject invention is described in the general context of computer-executable instructions, such as program modules, executed by one or more computers or other devices, those skilled in the art will recognize that the subject invention can also be implemented in combination with other program modules and/or as a combination of hardware and software. Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the subject invention. Other well known computer systems, environments, and/or configurations that may be suitable for use with the subject invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 for implementing various aspects of the subject invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the subject invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include but are not limited to: Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes but are not limited to, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A virtual network management system comprising:
a memory; and
a processor, operatively coupled to the memory, the processor executing computer-executable components, comprising:
a user interface component that receives requirements input by a user for a virtual network, the virtual network comprising one or more virtual devices that are interconnected, the user interface component generates an XML message comprising at least the requirements and empty fields reserved for configuration information of the virtual network, wherein the user interface component parses the message to retrieve the requirements and calculate resources required to support the requirements;
an identification component that receives the message generated by the user interface component and that identifies one or more server(s) from a plurality of servers available to the virtual network that fulfills the requirements from the message and has available resources, the identification component updates at least a subset of the empty fields of the received message with configuration information of the one or more server(s) identified with the identification component; and
a creation component that receives the updated message from the identification component and creates a virtual server session associated with the virtual network based, at least in part, upon the one or more server(s) identified by the identification component, wherein the creation component creates the virtual server session by performing the following:
creating a subdirectory to host the virtual server session,
creating a differencing drive file that defines the deployment configuration,
creating a virtual machine, and attaching the differencing file to the virtual machine,
creating a virtual network, and attaching the virtual machine to the virtual network, and
starting the virtual network.

2. The system of claim 1, the requirements input by the user comprising at least one of: an operating system, a processor, a memory quantity, a virtual storage quantity, a graphics requirement, a floppy drive, a port for a peripheral device, or a device.

3. The system of claim 1, the requirements input by the user further providing a life-time of the virtual network.

4. The system of claim 1, the user interface component employing a common infrastructure to facilitate creation or management of a variety of virtual deployment configurations.

5. The system of claim 1, the user interface component comprising a web-based interface that allows a user to configure the virtual network.

6. The system of claim 1, identification of the one or more server(s) by the identification component being further based, at least in part, upon load-balancing across the plurality of servers.

7. The system of claim 1, further comprising a server data store that stores configuration information for the plurality of servers.

8. The system of claim 7, identification of the one or more server(s) by the identification component based, at least in part, upon configuration information stored in the server data store.

9. The system of claim 1, further comprising a configuration data store that stores configuration information for a desired deployment configuration.

10. The system of claim 9, identification of the one or more server(s) by the identification component based, at least in part, upon configuration information stored in the configuration data store.

11. The system of claim 1, the updated message of the identification component comprising a target driver letter, job identifier, or a server configuration.

12. The system of claim 1 further comprising an expiration component that can expire a virtual session that is no longer in use by releasing resources associated with the session.

13. The system of claim 1, the user interface component further providing information that specifies at least one application to include or simulate in the virtual network.

14. A method for allocating system resources in a virtual network environment comprising:
employing a processor executing computer-executable instructions stored on a computer-readable storage medium to implement the following acts:
receiving user requirements associated with a virtual network, the virtual network comprising one or more virtual devices that are interconnected;
creating an updateable XML message based, at least in part, upon the user requirements;
sending the updateable message to a first message queue;
retrieving the updateable message from the first message queue;
parsing the user requirements from the message;
calculating a quantity of resources to fulfill the user requirements for the virtual network;
identifying available server(s) of a plurality of servers, if any, that fulfill the user requirements from a server data store having configuration information for the plurality of servers in a deployment infrastructure available for the virtual network;
validating resources on the identified server(s) so as to verify that the identified server can fulfill the user requirements;
updating the updateable message that has the user requirements to further include configuration information of the available identified server(s);
sending the updateable message that has the user requirements and configuration information for the identified server(s) to a second message queue;
retrieving the updateable message that has the user requirements and server configuration information from the second message queue;
parsing the configuration information from the updateable message; and
creating a virtual network based on the configuration information by performing the following:
creating a subdirectory to host the virtual server session,
creating a differencing drive file that defines the deployment configuration,
creating a virtual machine, and attaching the differencing file to the virtual machine,
creating a virtual network, and attaching the virtual machine to the virtual network, and
starting the virtual network.

15. The method of claim 14, identifying available server(s) further based on load-balancing of the plurality of servers.

16. A computer-implemented system for managing a virtual server session comprising:
at least one processor that executes computer-executable code stored in memory to effect the following:
receive requirements from a user for a virtual network, the virtual network comprising one or more virtual devices that are interconnected;
generate an XML message having requirements, the message further provides empty elements retained for configuration information associated with the requirements;
receive and parse the user requirements from the message;
identify server(s) available to a deployment structure of the virtual server session from the requirements parsed from the message, the identification of the sewer(s) includes calculating resources necessary for the requirements, and determining resources of the servers using information stored in a server data store and information associated with current and scheduled load balancing of the sewers;
update the empty elements of the message with configuration information of the identified server(s);
receive and parse the message having the configuration information of the identified server(s);
create a virtual server session from the parsed message having the configuration information of the identified sewer(s) by performing the following:
creating a subdirectory to host the virtual server session,
creating a differencing drive file that defines the deployment configuration,
creating a virtual machine, and attaching the differencing file to the virtual machine,
creating a virtual network, and attaching the virtual machine to the virtual network, and
staffing the virtual network;
update the message with the virtual machine and a time that the creation of the virtual server session is completed; and
notify the user that initiated the request via email that the virtual server session has been created.

17. The system of claim 1, the user interface component receives requirements via a web-based interface.

* * * * *